US006421913B1

(12) United States Patent
Bonnah, II et al.

(10) Patent No.: US 6,421,913 B1
(45) Date of Patent: Jul. 23, 2002

(54) RETENTION FEATURE FOR ASSEMBLING A POLE PIECES INTO A TUBE OF A FUEL INJECTOR

(75) Inventors: Harrie William Bonnah, II, East Grand Rapids, MI (US); Otto Muller-Girard, Jr.; Michael Schneider, both of Rochester, NY (US); Robert B. Perry, Leicester, NY (US); Karl Jacob Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/487,638

(22) Filed: Jan. 19, 2000

(51) Int. Cl.[7] .................................................. B23P 17/00

(52) U.S. Cl. .............................. 29/888.46; 29/890.131; 29/515; 29/525.14; 228/173.4

(58) Field of Search .......................... 29/888.46, 890.12, 29/890.124, 890.036, 453, 516, 517, 890.131, 525.14, 888.4, 515; 285/382, 921; 228/126, 131, 164, 173.1, 173.4, 173.5; 138/114, 142; 403/270, 271, 272

(56) References Cited

U.S. PATENT DOCUMENTS

| | | | | | |
|---|---|---|---|---|---|
| 1,291,388 | A | * | 1/1919 | Bright et al. | 285/382 |
| 1,329,479 | A | * | 2/1920 | Savon | |
| 1,618,611 | A | * | 2/1927 | Trout | |
| 2,259,433 | A | * | 10/1941 | Kitto | 29/890.036 |
| 2,343,402 | A | * | 3/1944 | Clifford | 228/131 |
| 3,958,425 | A | * | 5/1976 | Maroschak | 285/921 |
| 4,030,668 | A | * | 6/1977 | Kiwior | 29/888.46 |
| 4,063,760 | A | * | 12/1977 | Moreiras | 285/921 |
| RE30,802 | E | * | 11/1981 | Rogers, Jr. | 29/890.036 |
| 4,348,794 | A | * | 9/1982 | Kim et al. | 29/890.036 |
| 4,590,652 | A | * | 5/1986 | Harwood | 138/114 |
| 4,629,220 | A | * | 12/1986 | Crusco | |
| 4,697,832 | A | * | 10/1987 | Dickirson | 285/921 |
| 4,699,758 | A | * | 10/1987 | Shallenberger et al. | 285/921 |
| 4,790,055 | A | * | 12/1988 | Raufeisen et al. | 29/888.46 |
| 4,893,848 | A | * | 1/1990 | Melcher | 285/921 |
| 4,902,048 | A | * | 2/1990 | Washizu | 285/382 |
| 5,100,047 | A | * | 3/1992 | Nakagawa et al. | 228/176 |
| 5,101,889 | A | * | 4/1992 | Potier | 228/173.4 |
| 5,799,395 | A | * | 9/1998 | Nording et al. | 29/890.036 |
| 5,875,975 | A | * | 3/1999 | Reiter et al. | 29/890.124 |
| 6,059,477 | A | * | 5/2000 | Dunlap, Jr. et al. | 29/453 |
| 6,178,632 | B1 | * | 1/2001 | Worrel et al. | 29/888.46 |

* cited by examiner

*Primary Examiner*—S. Thomas Hughes
*Assistant Examiner*—T. Nguyen
(74) *Attorney, Agent, or Firm*—John VanOphem

(57) ABSTRACT

A method is provided for assembling a pole piece into an internal fuel passage of a fuel injector. The assembly method includes the steps of: (a) providing an endoskeletal injector tube, where the injector tube provides the fuel passage for the fuel injector; (b) forming at least one depression into an outer surface of the injector tube; (c) inserting an injector valve into the injector tube; (d) inserting the pole piece into the injector tube, wherein the pole piece is adjustable thereafter; and (e) affixing the pole piece within the injector tube, where an outer surface of the pole piece is in contact with an inner surface of the injector tube corresponding to the depressions, thereby creating a spring fit between the pole piece and the tube.

11 Claims, 3 Drawing Sheets

RETENTION FEATURE FOR ASSEMBLING A POLE PIECES INTO A TUBE OF A FUEL INJECTOR

TECHNICAL FIELD

The present invention relates generally to a method for coupling a pin into a sleeve and, more particularly, to a method for assembling a magnetic pole piece into a fuel passage of a fuel injector.

BACKGROUND OF THE INVENTION

It is well known in the automotive engine art to provide solenoid actuated fuel injectors for controlling the injection of fuel into the cylinders of an internal combustion engine. Fuel injectors generally include an internal fuel passage for fuel flow therein and a pole piece within the fuel passage which may be used to set the stroke length for the injector valve. Permanent fastening of the pole piece within the fuel passage of the injector could be accomplished by a press fit. In this case, the pole piece is slightly larger than the fuel passage, such that tight tolerancing of both components is required to achieve reasonable and consistent press loads. Alternatively, the pole piece may be assembled via a slip fit and affixed by means of a series of spot welds. Again, tight tolerances are required for both components.

Therefore, it is desirable to provide a method for assembling a magnetic pole piece into an internal fuel passage that improves the capability of or eliminates a secondary welding operation as well as relaxes tolerance control for the pole piece and the fuel passage.

SUMMARY OF THE INVENTION

In accordance with the present invention, a method is provided for assembling a magnetic pole piece into an internal fuel passage of a fuel injector. The assembly method includes the steps of: (a) providing an endoskeletal injector tube, where the injector tube provides the fuel passage for the fuel injector; (b) forming at least one depression into an outer surface of the injector tube; (c) inserting an injector valve into the injector tube; (d) inserting the pole piece into the injector tube, wherein the pole piece is adjustable thereafter; and (e) affixing the pole piece within the injector tube, where an outer surface of the pole piece is in contact with an inner surface of the injector tube corresponding to the depressions, thereby creating a spring fit between the pole piece and the tube.

For a more complete understanding of the invention, its objects and advantages, refer to the following specification and to the accompanying drawings.

DESCRIPTION OF THE PREFERRED EMBODIMENT

Figure 1:
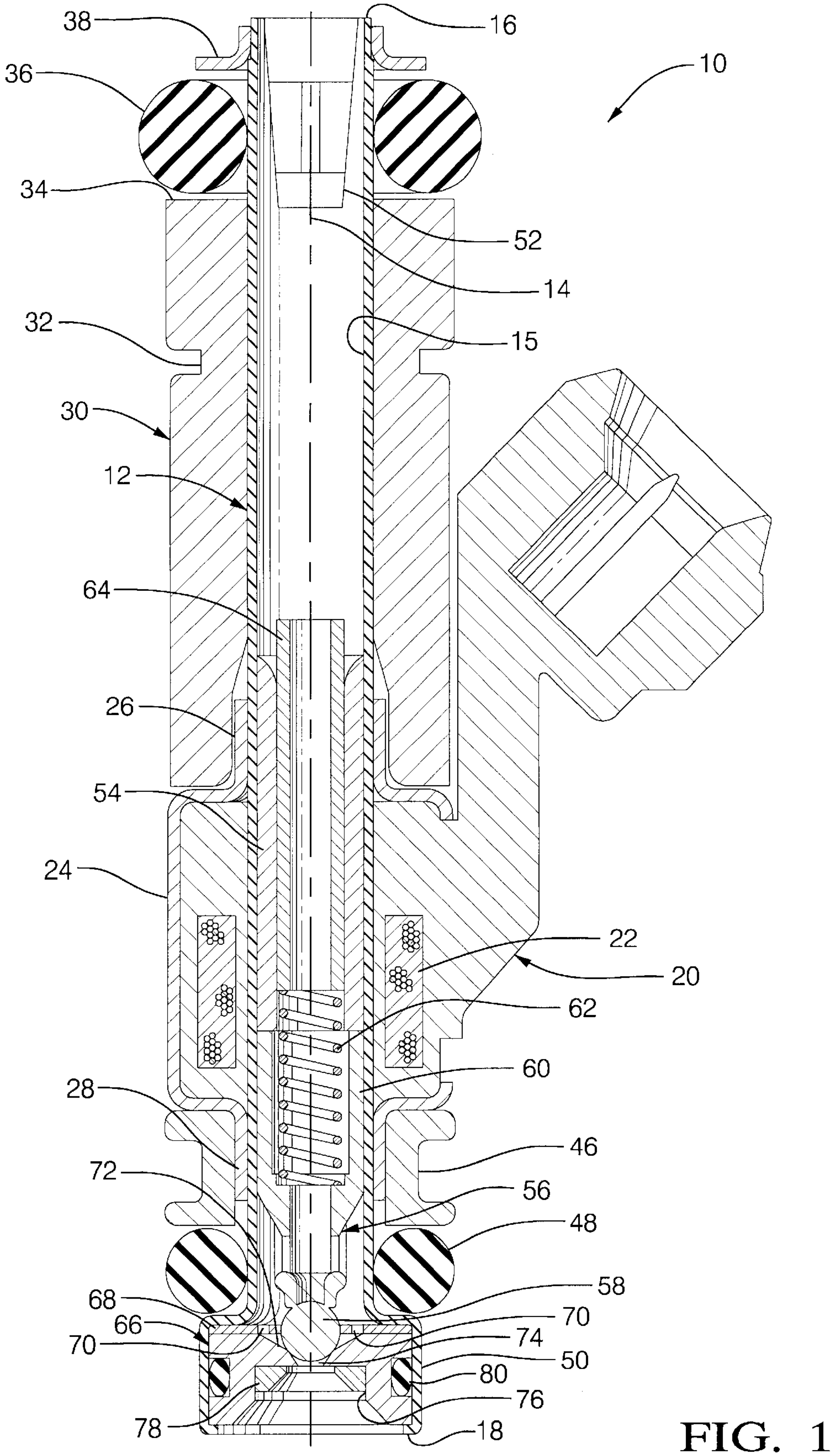
FIG. 1 is a transverse cross-sectional view along the axis of an exemplary embodiment of a fuel injector.

An electromagnetic fuel injector 10 embodying features of the present invention is depicted in FIG. 1. The fuel injector 10 includes a continuous endoskeletal injector tube 12 which is centered on a central axis 14 and encloses a continuous passage 15 through the injector from an inlet end 16 to an outlet end 18 of the injector tube 12. Preferably, the tube 12 has no openings except at the inlet and outlet ends and defines a continuous imperforate passage in which fuel is conducted and kept separate from all the components of the injector that are mounted externally of the tube. These components include a separately formed coil assembly 20 including a solenoid coil 22 extending around and closely adjacent to the tube but isolated thereby from the fuel in the tube. A magnetic coil body or strap 24 surrounds the coil 22 and has upper and lower ends 26, 28 fixed to the outer surface of the tube.

A support element 30 is formed as a tubular member that slides over the tube and engages the body 24 surrounding an upper portion thereof. The support element includes a slot 32 for receiving a retainer clip, not shown, that holds the injector inlet end within a cup, not shown, of an associated fuel rail. The support element 30 also provides a backup surface 34 at one end for constraining a seal ring 36 of the conventional O-ring type. A push-on seal retainer 38 is frictionally or otherwise retained on the inlet end 16 of the injector tube 12 to form with the other parts an annular groove in which the seal ring 36 is retained. A split spacer ring 46 extends around the lower end of the body 24 and engages an annular O-ring seal 48 which is retained, in part, by an expanded diameter portion 50 at the lower end of the injector tube 12.

Within the injector tube 12, an inlet fuel filter 52 is provided at the inlet end of the tube. A tubular magnetic pole 54 is fixed within the tube 12 in engagement with its interior surface. The pole extends from adjacent the upper end 26 of the body 24 to a position within the axial extent of the coil 22. An injection valve 56 is also positioned within the tube 12 and includes a ball end 58 connected with a hollow armature 60 that slides within the tube. A biasing spring 62 engages the armature 60 and an adjusting sleeve 64 is fixed within the magnetic pole 54 to urge the injection valve downward toward a closed position.

Within the expanded diameter portion 50 of the tube 12, a valve seat 66 and a lower valve guide 68 are retained by crimped over portions of the tube outlet end 18. The lower valve guide 68 is a disc positioned between the valve seat and a flange-like surface formed by the expanded diameter tube portion 50 to guide the ball end 58 of the injection valve. The disc includes openings 70 to allow fuel flow through the guide 68 to a conical surface 72 of the valve seat against which the ball end 58 seats in the valve closed position. A central discharge opening 74 of the valve seat 66 connects the conical surface 72 with a circular recess 76 in which a multi-hole spray director 78 is press fitted or otherwise retained therein. An outer seal ring 80 is captured in a groove of the valve seat and prevents fuel from leaking around the valve seat and bypassing the discharge opening 74. While the following description is provided with reference to a particular fuel injector configuration, it is readily understood that the broader aspects of the present invention are applicable to other types of fuel injectors.

In operation, energizing of the coil 22 draws the armature 60 upward into engagement with the end of the magnetic pole 54, moving the ball end 58 of valve 56 upward away from the conical surface 72 of the valve seat 66. Fuel is then allowed to flow through the tube 12 and valve seat 66 and out through the director 78 into an associated intake manifold or inlet port of an associated engine, not shown. Upon de-energization of the coil 22, the magnetic field collapses and spring 62 urges the valve 56 back onto the conical surface 72 of the valve seat 66, thereby cutting off further fuel injection flow.

To properly control the speed and efficiency of valve action in a fuel injector, it is important that the valve stroke be established at a desired predetermined value. This may be accomplished by making the position of the pole piece 54 adjustable within the injector tube 12. At a particular adjusted position, the pole is then couples to the injector tube 12. The present invention provides a method for assembling the pole piece into the internal fuel passage of a fuel injector.

Figure 2:
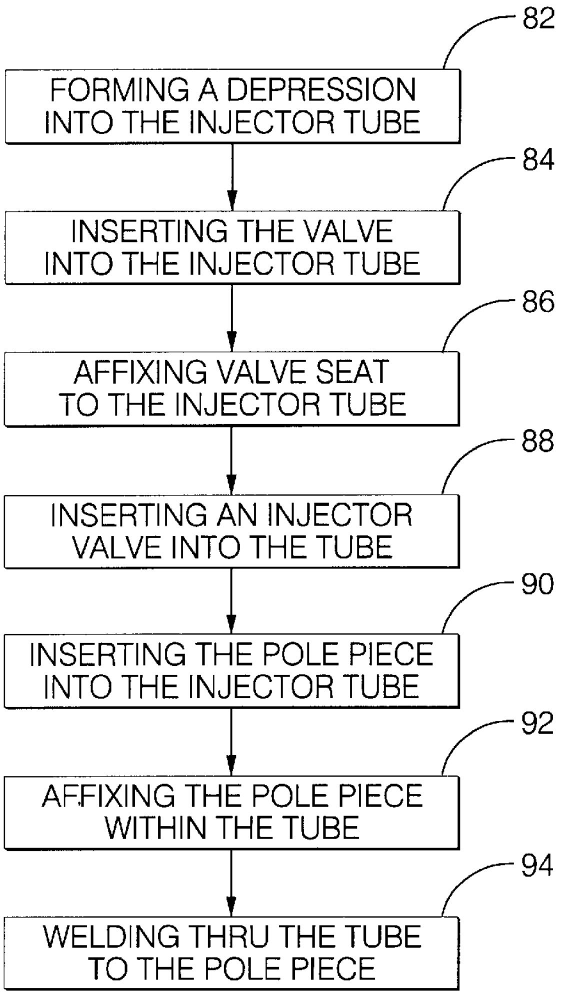
FIG. 2 is a flowchart illustrating a method for assembling a magnetic pole piece into an internal fuel passage of the fuel injector in accordance with the present invention.
Figure 3:
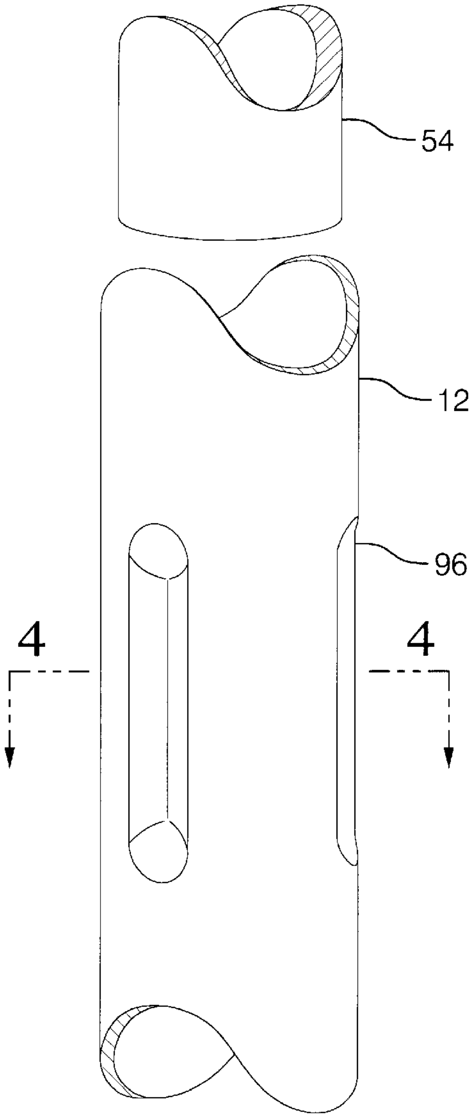
FIG. 3 is a schematic diagram illustrating the pole piece being inserted into an injector tube of the fuel injector.

A method for assembling the pole piece 54 into the fuel injector 10 is depicted in FIG. 2. For assembly of the fuel injector 10, various components are first manufactured and partially preassembled, where needed. For instance, the coil assembly 20 is preassembled in the manner previously indicated to provide a single unit ready for installation. The continuous endoskeletal injector tube 12 may also be preformed of suitable stainless steel material, or other suitable alternative material, having a constant diameter from its inlet end 16 to the expanded diameter portion 50 of the injector tube 12.

Figure 4A:
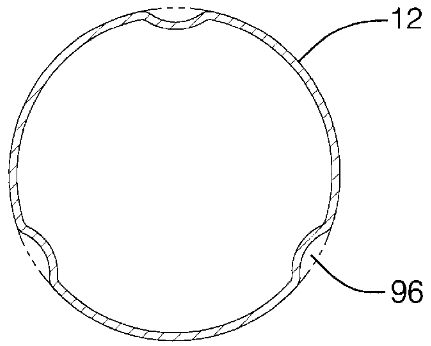
FIGS. 4A–4D are schematic cross-sectional view of an injector tube showing exemplary configurations for the depressions formed into the injector tube.
Figure 5A:
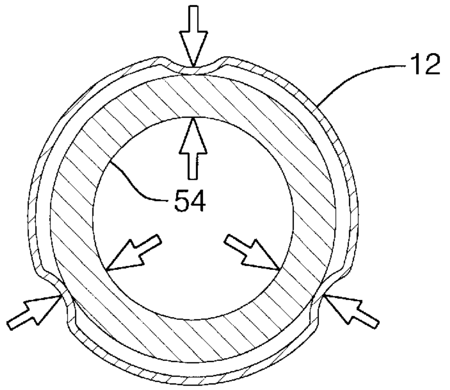
FIGS. 5A–5D are schematic cross-sectional views of a spring fit between the pole piece and the injector tube in accordance with the present invention.
Figure 4B:
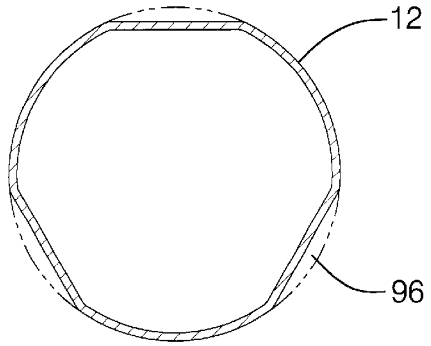
Figure 5B:
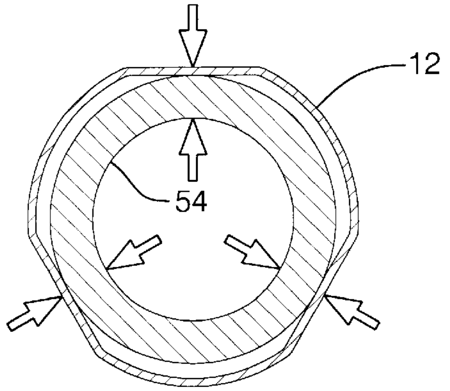
Figure 4C:
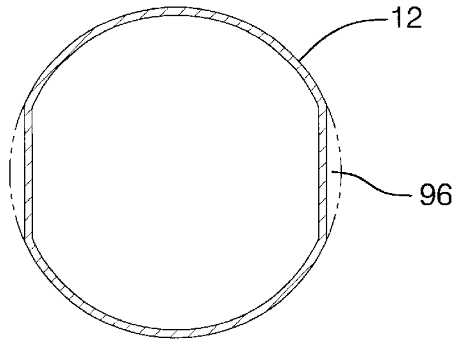
Figure 5C:
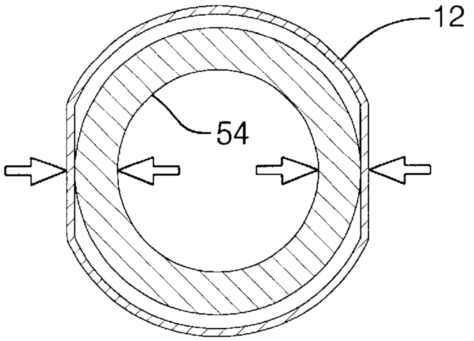
Figure 4D:
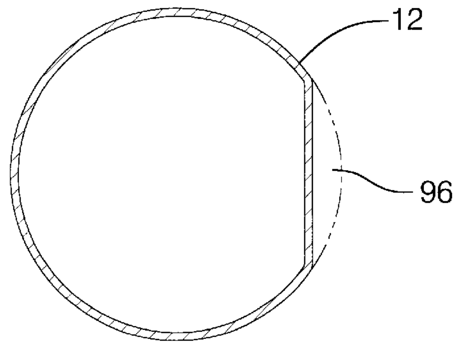
Figure 5D:
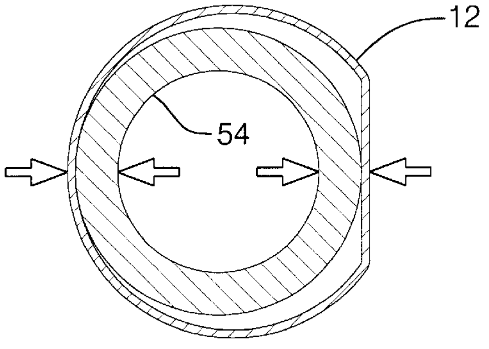

In accordance with the present invention, one or more deformations or depressions are formed 82 into the outer surface of the cylindrical injector tube. Deforming the injector tube 12 generates a shape in the tube that acts as a hoop spring upon insertion of the pole piece 54 into the injector tube 12. Referring to FIGS. 4A–4D, a variety of configurations can be used for the depressions 96 formed in the injector tube 12. For instance, the depressions 96 may be defined as two or more slotted dimples extending along a portion of the outer surface of the injector tube 12 as best seen in FIG. 4A. In another instance, the depressions may be defined as one or more planar surfaces extending along a portion of the injector tube. It is envisioned that other configurations for the depressions are within the scope of the present invention.

To form the deformations into the injector tube 12, an arbor may be placed inside the un-deformed tube, thereby creating a stop diameter for the dimple tooling. For instance, a gauge pin may be used as the crimp arbor and a three jaw chuck may be used as the dimpling tool. The procedure for forming the deformations includes: installing a gauge pin into the injector tube; placing the gauge pin/injector tube into the three jaw crimp fixture of the tool; crushing the tube to a particular inner diameter, such that the dimpling jaws bottom out as the tube deforms; removing the gauge pin/injector tube from the fixture of the tool; removing the gauge pin from the injector tube; and installing the pole piece into the deformed injector tube. After the gauge pin is removed, the measured inner diameter of the injector tube is slightly larger (i.e., 0.15 mm) than the inner diameter intended by the dimpling tool. Thus, the inner diameter of the injector tube experiences a spring back effect when the gauge pin is removed from the injector tube. Different shapes of deformation can be achieved by using different dimpling tools. For instance, rounded protrusions in the dimpling jaw will yield dimples, whereas flat protrusions in the tooling will yield slots in the injector tube. It is also envisioned that other techniques may be used to form the deformations.

In addition, the spring fit allows for relaxed tolerance control for the pole piece 54 and the injector tube 12. For instance, the injector tube may initially have a diameter and tolerance of 5.90+/−0.05 mm, but following the dimpling process the diameter becomes 5.35+/−0.01 mm. Thus, the initial size variation is reduced because the injector tube is being crushed to a set arbor pin. The key to the tolerance reduction is that the injector tube is reformed to a particular inner diameter and the only tolerance variant is due to injector tube spring back. Depending upon the selection of the gauge pin, the pole piece, and the injector tube, any number of interferences can be obtained through the above-described process.

Returning to FIG. 2, the valve seat assembly may be affixed 86 to the injector tube 12 and the injection valve 56 may be inserted 86 into the injector tube prior to inserting the pole piece 54 into the injector tube 12. More specifically, the lower valve guide 68 and the valve seat 66 containing the seal ring 80 are inserted into the expanded diameter portion 50, and the outer end of the injector tube 12 is crimped over to retain these elements therein. The spray director 78 may be press fitted into the circular recess 76 either before or after installation of the valve seat 66 in the expanded diameter portion 50 of the injector tube 12.

Next, the injection valve 56 and magnetic pole 54 may then be slid into the inlet end 16 of the injector tube, wherein the pole 54 is adjusted at some point thereafter to provide the proper gap for setting the stroke of the valve 56. Either before or after this step, the spring 62 may be installed and the adjusting sleeve 64 is forced into magnetic pole 54 in the proper position for providing suitable compression of the spring 62.

As the pole piece 54 is pushed further into the injector tube 12, the depressions in the tube spring outward capturing the outer surface of the pole piece 54. A "hoop spring" effect allows the inner surface of the injector tube 12 to firmly grasp the outer surface of the pole piece 54, thereby creating a spring fit. Referring to FIGS. 5A–5D, equal and opposing forces create normal (i.e., perpendicular) contact loads between the surface of the two components. The contact loads in turn generate the friction which holds the pole piece 54 securely within the injector tube 12. Thus, the pole piece 54 is affixed into position within the injector tube 12.

Next, the pole piece 54 may be further affixed 94 within the injector tube 12 by spot welding through the outer surface of the injector tube 12. In a typical slip fit between, the pole piece 54 and the injector tube 12, spot welding through the outer wall of the tube and across as air gap can cause a perforated weld that may leak fuel from the inner passage of the injector tube. In contrast, a metal to metal contact at the weld site has been shown to improve the capability of the spot welding process. In the present invention, metal to metal contact between the outer surface of the pole piece 54 and the inner surface of the injector tube 12 in the area corresponding to the depressions 96 will improve the capability of the spot welding process.

The external members are then assembled on the outside of the injector tube 12. The seal 48 is slid into position against the flange of the expanded diameter portion 50. Split spacer ring 46 may then be positioned against the seal or it may be added later. The coil body 24 is preferably made in two pieces which are assembled about the central portions of the coil assembly 20. The combined coil assembly and coil body are then slid over the inlet end of the tube and down into position, such that the lower end 28 of the two piece coil body is received within the spacer ring 46. At this time, the ends of the coil body may be, but are not required to be, welded or otherwise fixed to the injector tube 12.

Subsequently, the tubular support element 30 is slid over the inlet end of the tube with its lower end surrounding the upper end 26 of the body 24. The seal ring 36 and push-on seal retainer 38 are then slid over the inlet end of the injector tube 12. The assembled injector is then calibrated by adjusting the spring tension to obtain the desired fuel flow. Finally, the fuel filter 52 is installed in the inlet end 16 of tube 12, thereby completing assembly of the injector.

While the above description constitutes the preferred embodiment of the invention, it will be appreciated that the invention is susceptible to modification, variation, and change without departing from the proper scope or fair meaning of the accompanying claims.

What is claimed is:

1. A method for coupling a pin into a sleeve, comprising the steps of:

forming at least one depression into an outer surface of the sleeve;

inserting the pin into the sleeve such that an outside surface of said pin engages at least a portion of said at least one depression; and welding through the depression on the outer surface of the sleeve, thereby coupling the pin into the sleeve.

2. The method of claim 1 wherein the step of forming at least one depression further comprises defining three slotted dimples extending along a portion of the outer surface of the sleeve.

3. The method of claim 1 wherein each of said at least one depression comprises a planar surface extending axially along a portion of the sleeve.

4. The method of claim 1 wherein the step of inserting the pin further comprises positioning the pin adjacent to the depressions formed in the sleeve, thereby creating a spring fit between the pin and the sleeve.

5. The method of claim 1 wherein the pin comprises a pole piece and the sleeve comprises an injector tube that provides a fuel passage in a fuel injector.

6. A method for assembling pole piece into a fuel injector, comprising the steps of:

providing an endoskeletal injector tube, wherein the injector tube provides a fuel passage for the fuel injector;

forming at least one depression into an outer surface of the injector tube;

inserting an injector valve into the injector tube having the at least one depression formed therein;

inserting the pole piece into the injector tube having the at least one depression formed therein, wherein the pole piece is adjustable thereafter; and affixing the pole piece within the tube, wherein an outer surface of the pole piece is in contact with an inner surface of the injector tube corresponding to the depressions, thereby creating a spring fit between the pole piece and the tube.

7. The method of claim 6 further comprising the step of affixing a valve seat assembly to an outlet end of the injector tube after the step of forming at least one depression.

8. The method of claim 6 further comprising the step of welding through the depression on the outer surface of the injector tube after the step of affixing the pole piece within the injector tube.

9. The method of claim 6 wherein the step of forming at least one depression further comprises defining three slotted dimples extending along a portion of the outer surface of the injector tube.

10. The method of claim 1 wherein the step of forming at least one depression further comprises defining at least one planar surface extending along a portion of the injector tube.

11. The method of claim 6 further comprising the steps of:

sliding a coil assembly over the injector tube;

sliding a support element over the injector tube; and affixing a seal retainer onto an inlet end of the tube after the step of affixing the pole piece within the injector tube, thereby completing assembly of the fuel injector.

* * * * *